United States Patent [19]

Konoki et al.

[11] 4,444,731

[45] Apr. 24, 1984

[54] TUBE FOR THERMAL CRACKING OR REFORMING HYDROCARBON

[75] Inventors: Keizo Konoki, Tokyo; Takanobu Shinohara; Ikuyoshi Kochi, both of Chiba; Keiichi Shibata, Mobara; Hisakatsu Nishihara, Hirakata; Toshiaki Morichika, Hirakata; Junichi Sugitani, Hirakata; Koji Tsuchida, Hirakata, all of Japan

[73] Assignees: Kubota Ltd., Osaka; Toyo Engineering Corporation, Tokyo, both of Japan

[21] Appl. No.: 352,270

[22] Filed: Feb. 25, 1982

[30] Foreign Application Priority Data

Feb. 25, 1981 [JP] Japan ............................. 56-28089

[51] Int. Cl.³ .......................................... B01J 19/02
[52] U.S. Cl. ................................ 422/310; 75/126 R; 75/128 R; 138/141; 208/48 R; 422/241; 422/312; 585/636
[58] Field of Search ............... 422/310, 312, 240, 241; 585/636; 208/48 R; 75/126 R, 126 B, 126 F, 126 Q, 128 R, 128 A, 128 W, 128 G; 138/141, 145, 146

[56] References Cited

U.S. PATENT DOCUMENTS

| | | | |
|---|---|---|---|
| 2,339,368 | 1/1944 | Bagsar | 422/240 X |
| 2,448,462 | 8/1948 | Renzoni | 422/240 X |
| 3,262,983 | 7/1966 | Ladd et al. | 422/241 X |
| 3,536,776 | 10/1970 | Lo | 585/636 |
| 3,827,967 | 8/1974 | Nap et al. | 208/48 R |
| 4,343,658 | 8/1982 | Baker et al. | 208/48 R X |

FOREIGN PATENT DOCUMENTS

| | | | |
|---|---|---|---|
| 498859 | 1/1939 | United Kingdom | 422/241 |
| 1552284 | 9/1979 | United Kingdom . | |

OTHER PUBLICATIONS

Hawley, G. G., *The Condensed Chemical Dictionary*, 8th Ed., Sep. 4, 1974, Reinhold Co., pp. 616.

*Primary Examiner*—Richard L. Chiesa
*Attorney, Agent, or Firm*—Armstrong, Nikaido, Marmelstein & Kubovcik

[57] ABSTRACT

A reactor tube for thermally cracking or reforming hydrocarbons comprising an outer tube member made of Ni-containing heat resisting material and having enhanced mechanical strength with a large wall thickness, and an inner tube member of small wall thickness fitted in the outer tube member and made of heat resisting material free from Ni or with a low Ni content. The inner and outer tube members have been subjected to a diffusion treatment with a thin coating of Ni-P solid solution provided at the junction therebetween and thereby bonded together.

10 Claims, 3 Drawing Figures

TUBE FOR THERMAL CRACKING OR REFORMING HYDROCARBON

BACKGROUND OF THE INVENTION

The present invention relates to an improvement in a reactor tube for thermally cracking or reforming hydrocarbons.

When a liquid or gaseous hydrocarbon is subjected to the chemical reaction of thermal cracking or reforming at high temperature and high pressure in the presence or absence of a catalyst, solid carbon deposits, and the carbon deposit builds up in the lamellar form in the reaction zone on a surface of a tube serving as the reactor. While the following description will be given of the case in which solid carbon deposits on the inner surface of the tube, solid carbon will deposit on the outer surface or on both the inner and outer surfaces of the tube when the reactor is designed to effect the chemical reaction of hydrocarbons outside or inside and outside of the tube.

When a hydrocarbon is passed through the tube for the chemical reaction, the deposit of solid carbon on the inner surface of the tube, if allowed to build up, impedes the flow of a fluid containing the hydrocarbon. The carbon deposit also results in a seriously reduced heat transfer efficiency when reaction heat is supplied to or removed from the tube from outside to carry out the cracking or reforming chemical reaction. Consequently it becomes difficult to continue the operation of the reactor.

The material heretofore used for such reactors is Fe-Cr-Ni austenitic heat resisting steel which contains large amounts of Ni and Cr for use at high-temperature, high-pressure operating conditions and which is generally used for fabricating high-temperature equipment. It is usual practice to increase the Ni content of the heat resisting steel material for tubes which are used at higher operating temperatures.

However, when a tube is used which is produced from the Fe-Cr-Ni austenitic heat resisting steel, solid carbon inevitably deposits on the inner surface of the tube, giving rise to the necessity for shutdowns to decoke the reactor by various methods although the reactor is to be operated continuously as a rule.

The deposition of solid carbon occurs more markedly if the steel material has a higher Ni content. In this case, solid carbon deposits on the tube inner surface in a short period of time, and the carbon deposit builds up rapidly, consequently entailing the problem that the reactor must be decoked more frequently.

We have carried out intensive research on the deposition of solid carbon on the tube inner surface and found that there is a correlation between the amount of the solid carbon deposit and the Ni content of the Fe-Cr-Ni austenitic heat resisting steel material which forms the reactor tube and further that the Ni in the steel material, especially the Ni portion present on the inner surface of the tube, acts catalytically to promote the deposition of solid carbon from hydrocarbons.

SUMMARY OF THE INVENTION

According to the present invention, the deposition of solid carbon on a reactor tube is prevented to the greatest possible extent while the tube is in use for thermally cracking or reforming hydrocarbons. For this purpose, the surface of the tube to be brought into contact with a fluid containing the hydrocarbon is covered with a tube of a heat resisting material free from Ni or with a low Ni content to hold the Ni contained in the reactor tube out of contact with the hydrocarbon, whereby the foregoing problems are basically overcome.

More specifically the present invention provides a reactor tube for thermally cracking or reforming hydrocarbons comprising a tube member of Fe-Cr-Ni austenitic heat resisting steel and another tube member made of Fe-Cr ferritic, ferritic-austenitic or martensitic heat resisting steel and fitted to the tube member with a thin coating of Ni-P solid solution provided therebetween, the two tube members being bonded together by a diffusion treatment.

DETAILED DESCRIPTION OF THE INVENTION

Figure 1:
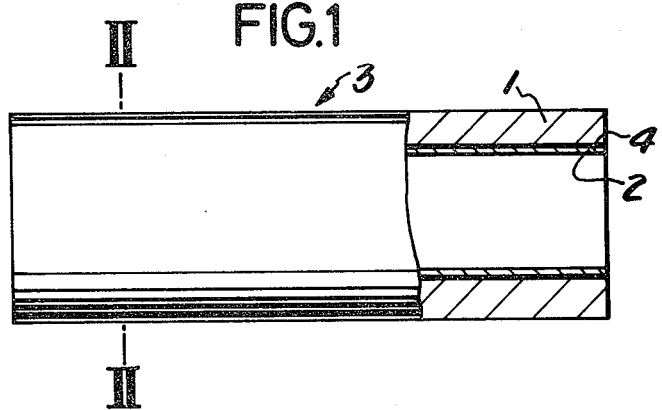
FIG. 1 is a front elevation view partly broken away and showing a reactor tube according to the invention.
Figure 2:
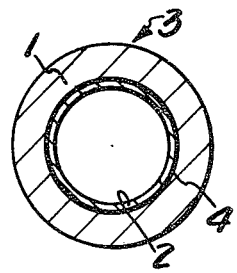
FIG. 2 is a view in section taken along the line II—II in FIG. 1.

FIGS. 1 and 2 show an embodiment of the invention, i.e. a reactor tube 3, comprising an outer tube member 1 and an inner tube member 2 fitted in and bonded to the member 1. The outer tube member 1 is made of Fe-Cr-Ni austenitic heat resisting steel which is usually used for tubes of the type described. Preferably the blank tube for the tube member 1 is one produced by centrifugal casting. On the other hand, the inner tube member 2 which is the inner component of the tube 3 is made of a steel free from Ni or with a low Ni content, especially heat resisting steel of Fe-Cr ferritic, ferritic-austenitic or martensitic type. The blank for the inner tube member 2 may be a cast tube prepared, for example, by centrifugal casting or a forged tube made, for example, by drawing.

The inner surface of the blank for the outer tube member 1 and the outer surface of the blank for the inner tube member 2 are finished by machining.

A Ni-P solid solution is applied to at least one of the inner surface of the outer tube member 1 and the outer surface of the inner tube member 2 by immersion or electroless plating to provide a thin coating 4 of Ni-P solid solution between the members 1 and 2 to be joined together. The thin coating 4 of Ni-P solid solution is composed of 8 to 12 wt. % of P and the balance Ni and has a thickness of about 100 $\mu$m.

Subsequently the inner tube member 2 is fitted in and joined to the outer tube member 1 to obtain the desired reactor tube 3 having an inner surface free from Ni or with a low Ni content.

While the inner and outer tube members fitted together are bonded together by a diffusion treatment as will be described below, the Ni-P solid solution coating 4 at the junction between the inner and outer members is very useful for giving an enhanced diffusion effect and facilitating the diffusion treatment.

After the application of the solid solution, the inner tube member 2 can be joined to the outer tube member 1 effectively, for example, by exploding an explosive set in place inside the inner member or outside the outer member with the tube members fitted together properly, by shrink fitting or by drawing or extruding the inner tube member as fitted in the outer tube member.

When the outer and inner tube members are thus joined together, the two members are joined almost solely mechanically at the junction but are not bonded together from the viewpoint of metallic structure or chemical components, namely metallurgically. Accordingly the inner and outer tube members are subjected to a diffusion treatment by heating to metallurgically bond them together. The Ni-P solid solution coating 4 provided at the junction interface between the inner and outer tube members serves an outstanding fuction for the diffusion treatment.

The diffusion treatment is carried out by maintaining the members at 900° to 1000° C. in a heating furnace for 2 to 5 hours. This treatment causes the Ni-P solution to readily diffuse through the thicknesses of the inner tube member 2 and the outer tube member 1 to effectively bond the two members together by mutual diffusion. Since the melting temperature of the solid solution is as low as 880° to 1000° C., the diffusion treatment can be conducted at a lower temperature within a shorter period of time with greater ease than when the Ni-P solid solution coating 4 is absent.

The diffusion treatment affords the desired reactor tube 3 in which the inner and outer tube members are completely bonded together by mutual diffusion.

The Ni-containing heat resisting steel forming the outer tube member 1 of the reactor tube 3 of this invention is Fe-Cr-Ni austenitic heat resisting steel. More specifically an example of such useful steel comprises 0.1 to 0.6% (by weight, the same as hereinafter) C, up to 2.5% Si, 20 to 30% Cr, 18 to 40% Ni, up to 2.0% Mn, up to 0.15% N and the balance substantially Fe. Also usable is an alloy of the above composition wherein the Fe is partly replaced by one or at least two of Mo, W and Nb in a combined amount of up to 5%.

The heat resisting material free from Ni or with a low Ni content forming the inner tube member 2 is Fe-Cr ferritic, ferritic-austenitic or martensitic heat resisting steel. More specifically an example of useful alloy comprises 13 to 30% Cr, 0 to 5% Ni, 0.01 to 0.6% C, up to 2.5% Si, up to 2.0% Mn, up to 0.15% N and the balance substantially Fe.

However, the proportions of the components may be outside the above ranges or some components may be added to or removed from these materials insofar as the technical object of the invention can be fulfilled.

The blank tubes usable for the outer and inner tube members 1, 2 of the invention include those made by casting (especially centrifugal casting), extrusion, drawing, and bending a plate into a tubular form and welding the plate.

Because the inner tube member 2 of heat resisting steel free from or almost free from Ni provides the inner surface of the reactor tube to be exposed to the flow of a hydrocarbon-containing fluid, the invention greatly reduces the likelihood that Ni will act adversely as a catalyst, with the result that the deposition of solid carbon can be inhibited effectively.

With conventional reactor tubes, the carbon separating out from the fluid invades the wall of the reactor and forms carbides in the microstructure of the heat resisting steel which forms the reactor wall, thus causing so-called cementation to inevitably embrittle or damage the reactor seriously, whereas when the inner tube member 2 is bonded to the outer tube member 1, the presence of the alloy of the inner tube member inhibits separation of carbon per se, whereby cementation can be prevented effectively.

Since the reactor tube is used at high temperatures and high pressures, the Fe-Cr-Ni austenitic heat resisting steel material forming the tube (outer tube member 1) must of course have sufficient heat resistance and high-temperature strength to withstand the operating temperature and pressure. The outer tube member therefore has an inside diameter of 50 to 200 mm and a wall thickness of about 25 mm.

On the other hand, the Fe-Cr heat resisting steel material forming the tube (inner tube member 2) and only serving to hold the surface of the outer tube member out of contact with hydrocarbons need not have strength to withstand the pressure, so that the inner tube member 2 may have a desired wall thickness. While it is desirable for the inner member to have a thickness of about 0.1 to 1 mm since the member will not be resistant to thermal stress, abrasion, corrosion, etc. if having too small a wall thickness, the increase of the wall thickness entails the need to elevate the temperature of the tube wall for cracking or reforming hydrocarbons. Accordingly the inner tube member 2 bonded to the outer tube member 1 can be internally cut by a machine to suitably reduce the wall thickness (for example, to 0.5 mm or smaller).

The present tube, although comprising the outer tube member 1 and the inner tube member 2 fitted therein can be used under the same operating conditions as practiced conventionally because the amount of solid carbon deposit decreases to consequently inhibit the rise of the tube wall temperature during operation, such that the tube can be designed for a lower temperature under the same operating conditions as heretofore employed. It is therefore possible to construct the reactor tube 3 with a smaller overall wall thickness than conventional tubes and to operate the tube for a period of time per annum not shorter than is the conventional case.

The tube of this invention is advantageously usable for thermally cracking hydrocarbons singly or as admixed with steam, oxygen-containing gas or the like to obtain lower-molecular-weight hydrocarbons or to produce a gaseous fluid containing hydrogen, carbon oxide, etc., under the conditions of at least 500° C. in temperature and pressure of not lower than the atmospheric which involve the necessity of using Ni-containing heat resisting steel.

Figure 3:
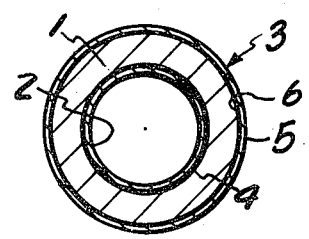
FIG. 3 is a sectional view showing a tube according to another embodiment.

FIG. 3 shows an embodiment for subjecting hydrocarbons to a chemical reaction inside and outside the tube 3. Tube members 2, 5 of Fe-Cr ferritic, ferritic-austenitic or martensitic heat resisting steel are fitted to the inner surface and outer surface of a tube member 1 of Fe-Cr-Ni austenitic heat resisting steel, with thin Ni-P solid solution coatings 4, 6 provided between the tube member 1 and the tube members 2, 5 respectively, the tube members 1, 2, 5 being bonded together.

Where thermal cracking or reforming reaction is performed only at outside the tube member 1 and a combustion gas is passed through inside of the tube member 1, the tube member 2 fitting to the inner surface of the tube 1 can be omitted from the embodiment of FIG. 3 leaving only the tube member 5 on the outer surface of the tube member 1.

The present invention is not limited to the foregoing embodiments and the drawings but can be embodied into various modifications. It is to be understood that such modifications are included within the scope defined in the appended claims.

What is claimed is:

1. A hydrocarbon reforming or thermally cracking reactor tube comprising:
   a tube member made of Ni-containing heat resisting material and having enhanced mechanical strength afforded by a large wall thickness,
   another tube member made of heat resisting material free from Ni or with a low Ni content, the tube member having a small wall thickness and being fitted to the inner or outer surface of the first-mentioned tube member defining a reaction zone for the hydrocarbon, and a thin coating of Ni-P solid solution provided between the two tube members,
   the two tube members being bonded together by a diffusion treatment.

2. A reactor tube as defined in claim 1 wherein the Ni-containing tube member is made of Fe-Cr-Ni austenitic heat resisting steel.

3. A reactor tube as defined in claim 2 wherein the Ni-containing tube member comprises the following components in the following proportions in terms of % by weight:
   C 0.1-0.6%,
   Si up to 2.5%,
   Cr 20-30%,
   Ni 18-40%,
   Mn up to 2.0% and
   N up to 0.15%,
   the balance being substantially Fe.

4. A reactor tube as defined in claim 2 wherein the Ni-containing tube member comprises the following components in the following proportions in terms of % by weight:
   C 0.1-0.6%,
   Si up to 2.5%,
   Cr 20-30%,
   Ni 18-40%,
   Mn 2.0% and
   N up to 0.15%,
   the Ni-containing tube member further comprising one or at least two of Mo, W and Nb in a combined proportion of up to 5% by weight, the balance being substantially Fe.

5. A reactor tube as defined in claim 1 wherein the tube member free from Ni or with a low Ni content is made of Fe-Cr ferritic, ferritic-austenitic or martensitic heat resisting steel.

6. A reactor tube as defined in claim 5 wherein the tube member free from Ni or with a low Ni content comprises the following components in the following proportions in terms of % by weight:
   C 0.01-0.6%,
   Si up to 2.5%,
   Cr 13-30%,
   Ni 0-5%,
   Mn up to 2.0% and
   N up to 0.15%,
   the balance being substantially Fe.

7. A reactor tube as defined in claim 1 wherein the tube member free from Ni or with a low Ni content is bonded to the inner surface of the Ni-containing tube member.

8. A reactor tube as defined in claim 1 wherein the tube member free from Ni or with a low Ni content is bonded to the outer surface of the Ni-containing tube member.

9. A reactor tube as defined in claim 1 wherein the tube member free from Ni or with a low Ni content is bonded to each of the inner and outer surfaces of the Ni-containing tube member.

10. A reactor tube as defined in claim 1, wherein the thin coating of Ni-P solid solution consists essentially of 8 to 12% by weight of P and the balance being substantially Ni.

* * * * *